United States Patent

[11] 3,607,946

[72] Inventors Erich Behr
Troisdorf;
Gunter Meyer, Oberlar, both of Germany
[21] Appl. No. 37,408
[22] Filed May 11, 1970
[45] Patented Sept. 21, 1971
[73] Assignee Dynamit Nobel Aktiengesellschaft
Troisdorf, Germany
[32] Priority May 17, 1967
[33] Germany
[31] D 53104
Continuation of application Ser. No. 721,609, Apr. 16, 1968, now abandoned.

[54] PRODUCTION OF TECHNICALLY PURE 2,6-DIMETHYLANISOLE
1 Claim, No Drawings
[52] U.S. Cl. .................................................. 260/612 D
[51] Int. Cl. ................................................ C07c 43/20
[50] Field of Search ..................................... 260/612 D

[56] References Cited
UNITED STATES PATENTS
797,024   8/1905   Sparre .......................... 260/612 (D)
2,529,887  11/1950  Smutz ............................ 260/612 (D)
FOREIGN PATENTS
646,715  11/1950  Great Britain ................ 260/612 (D)
OTHER REFERENCES
Schmidt, " Berichte" (1908), page 2339
Baldwin et al., " Jour. Chem. Soc." (London) (1934), page 1266

*Primary Examiner*—Bernard Helfin
*Attorney*—Burgess, Dinklage & Sprung

ABSTRACT: Process for preparing technically pure 2,6-dimethylanisole comprising reacting 2,6-dimethylphenol and methyl chloride in an alkaline, aqueous medium at a temperature of from 20 to 100° C. and a pressure of up to 15 atmospheres gauge and thereafter separating the 2,6-dimethylanisole by steam distillation from an alkaline solution.

PRODUCTION OF TECHNICALLY PURE 2,6-DIMETHYLANISOLE

This application is a streamlined continuation of Ser. No. 721,609, filed Apr. 16, 1968 and now abandoned.

This invention relates to the production of technically pure 2,6-dimethylanisole.

2,6-dimethylanisole has heretofore been prepared by reacting 2,6-dimethylphenol in an aqueous alkaline solution with dimethylsulfate at a reaction temperature which can be higher than 60° C. (Beilstein, Vol. 6, 4Eg Volume (1966), p. 1737). The separation and purification of the reaction product has generally been carried out by extraction with ether, the reaction product being purified by distillation after the ether had been evaporated off. It has also been proposed to purify unsubstituted anisole of phenolic impurities by washing it with alkaline water and then distilling the washed anisole in vacuo. Another proposal for steam distillation from a neutral medium has not resulted in a clean separation of the dimethylanisole from the unreacted dimethylphenol, since the latter is steam volatile to a great extent, despite its high boiling point.

The most serious disadvantage of the known method set out above of preparing 2,6-dimethylanisole lies in the use of toxic dimethylsulfate in that process.

In accordance with the invention, it has now been found that the above disadvantages can be avoided and technically pure 2,6-dimethylanisole obtained from 2,6-dimethylphenol by reacting the dimethylphenol with methyl chloride in alkaline, aqueous solution at temperatures of from 20° C. to 100° C. and elevated pressure, and thereafter separating the reaction product from an alkaline solution thereof by means of steam distillation.

In the process of the invention it is advantageous to dissolve the substituted phenol in dilute alkali lye in an autoclave, and to then evacuate the autoclave. The methyl chloride is then pumped in, and then the reaction mixture is heated. Up to a temperature of 50° C., the pressure in the autoclave corresponds to the vapor pressure of the methyl chloride. Above 50° C. a marked reaction is perceivable, which becomes more energetic and rapid as the temperature and hence the pressure rise. In the production of 2,6-dimethylanisole, the reaction takes place so rapidly even at a temperature of 75° C., corresponding to a pressure of 12 atmospheres gauge, that a pressure drop takes place. Even in the case of further intensive heating up to as much as 90° C., the reaction is such that the pressure of 12 atmospheres can no longer be maintained on account of the consumption of methyl chloride.

The separation of the reaction products from the unreacted phenol by means of steam distillation from a neutral solution produces impure and yellowish distillates. When, however, a steam distillation is carried out according to the process of the invention from an alkaline solution, a water-clear product is obtained having a purity of 97–98 percent. If greater purity is required, the impurities can be removed by treatment of the product with aqueous soda lye, or else another steam distillation can be carried out from an alkaline phase. In this manner products having a purity of about 99.5 percent are obtained. The alkaline solution can be a solution of hydroxydes of alkali or alkali earth metals, the pH of this solution can vary from eight to 14.

The following example will further illustrate this invention but the invention is not restricted to this example.

EXAMPLE 7.5 kg. of 2,6-dimethylphenol were dissolved in an agitator-equipped autoclave in 5.25 kg. of 50 percent technical soda lye and 9.25 kg. of water. After the evacuation of the autoclave, 3.6 kg. of methyl chloride were pumped in and the mixture heated with intense agitation. The pressure in the autoclave corresponded at 50° C. to the methyl chloride vapor pressure. At a temperature above 50° C. the reaction set in. By intense heating to 75° C., a pressure of 12 atmospheres was achieved (less than the pressure corresponding to the methyl chloride vapor pressure). Thereafter a pressure drop takes place. Even on additional heating to 90° C., the pressure continued to fall. After 3.5 hours the final pressure of 3 to 3.5 atmospheres gauge pressure was reached. The remaining methyl chloride was valved off and, after agitation of the reaction mixture was discontinued, the organic upper phase was separated from the alkaline-aqueous lower phase. The organic phase was then poured into the same volume of a 5 percent aqueous caustic soda solution. The substituted ether was driven over by the introduction of steam, while the unreacted phenol remained in the aqueous alkaline phase. After simple separation of the two layers of the distillate, 6.6 kg. (78.9 percent of theory) of 2,6-dimethylanisole having a purity of 97 percent were obtained.

We claim:

1. In a process wherein 2,6-dimethylphenol is reacted under pressure with a methylating agent in aqueous alkaline solution at a temperature in the range of 50° to 90° C. and 2,6-dimethylanisole is recovered from the reaction products, the improvement comprising:
   1. using methyl chloride as said methylating agent, and
   2. recovering said 2,6-dimethylanisole by:
      a. discontinuing the reaction,
      b. separating the organic phase from the reactants,
      c. adding an aqueous alkaline solution to said organic phase,
      d. steam distilling the resulting mixture,
      e. and recovering technically pure 2,6-dimethylanisole from the distillate from said steam distilling by simple separation.